United States Patent
Ruotsalainen et al.

(10) Patent No.: US 7,515,938 B2
(45) Date of Patent: Apr. 7, 2009

(54) RECEIVER AND DATA TRANSFER METHOD

(75) Inventors: Sami Ruotsalainen, Helsinki (FI); Jan Storgårds, Espoo (FI)

(73) Assignee: Suunto Oy, Vantaa (FI)

( * ) Notice: Subject to any disclaimer, the term of this patent is extended or adjusted under 35 U.S.C. 154(b) by 559 days.

(21) Appl. No.: 11/147,427

(22) Filed: Jun. 8, 2005

(65) Prior Publication Data

US 2006/0009261 A1    Jan. 12, 2006

(30) Foreign Application Priority Data

Jul. 12, 2004    (FI) ................................. 20040974

(51) Int. Cl.
    *H04Q 7/20* (2006.01)
(52) U.S. Cl. .................... 455/557; 455/558; 455/550.1; 455/41.2; 455/41.3; 455/66.1; 600/301; 600/340; 600/310; 600/309
(58) Field of Classification Search ................ 455/557, 455/422.1, 558, 556.1, 575.1, 403, 445, 466, 455/414.1, 414.3, 41.1, 41.2, 41.3, 11.1, 455/500, 517, 66.1, 90.1, 90.2, 90.3, 412.1, 455/412.2, 575.7; 600/301, 340, 310, 309 600/382

See application file for complete search history.

(56) References Cited

U.S. PATENT DOCUMENTS

| | | | |
|---|---|---|---|
| 5,611,346 A | 3/1997 | Heikkila et al. | |
| 5,743,269 A | 4/1998 | Okigami et al. | |
| 5,918,163 A | 6/1999 | Rossi | |
| 6,138,005 A * | 10/2000 | Park | ............... 455/411 |
| 2002/0174337 A1 | 10/2002 | Antos et al. | |
| 2004/0152961 A1 * | 8/2004 | Carlson et al. | ............... 600/301 |
| 2004/0199056 A1 * | 10/2004 | Husemann et al. | ........... 600/300 |
| 2005/0134451 A1 | 6/2005 | Nikkola | |
| 2005/0231330 A1 * | 10/2005 | Drews et al. | ............. 340/10.51 |
| 2005/0245995 A1 | 11/2005 | Diebold | |

FOREIGN PATENT DOCUMENTS

| | | |
|---|---|---|
| EP | 1 180 814 A2 | 2/2002 |
| EP | 1 639 773 A2 | 1/2005 |
| EP | 1 591 943 A2 | 2/2005 |
| FI | 96380 B | 2/1995 |
| FI | 115677 B | 6/2005 |
| WO | WO-01/52718 A3 | 7/2001 |
| WO | WO 2005/002108 A2 | 1/2005 |

OTHER PUBLICATIONS 3G.co.uk, "3G FOMA Compact Flash Card" [online], (Nov. 3, 2003), from http://www.3g.co.uk/PR/Oct2003/6030.htm.
Unpublished patent application FI20040930, "Method and Heart-Rate Monitor," filed in Finland on Jul. 2, 2004, pp. 1-12.

* cited by examiner

*Primary Examiner*—Keith T Ferguson
(74) *Attorney, Agent, or Firm*—Birch, Stewart, Kolasch & Birch LLP

(57) ABSTRACT

The invention relates to a memory card for a mobile telephone, and a data-transfer method. The memory card according to the invention includes a receiver, which is able to receive information from at least one peripheral device of a wristop computer, or from a wristop computer.

16 Claims, 1 Drawing Sheet

RECEIVER AND DATA TRANSFER METHOD

BACKGROUND OF THE INVENTION

The present invention relates to a memory card, according to Claim 1, for a mobile telephone.

The invention also relates to a data transfer method.

DESCRIPTION OF RELATED ART

According to the prior art, data are transferred from a peripheral device to a wristop computer using either analog or digital wireless data transfer. Typical peripheral devices in a wristop computer include heart-rate belts, pedometers, speedometers, odometers, and, in cycling, chain-tension meters and pedalling cadence meters, together with their transmitters.

Data transfer from peripheral devices has been limited to only wristop computers belonging to the same system totality. In some cases, the data-transfer channel of the peripherals must be changed, if several wristop computers are in operation simultaneously in the same area.

Systems are also known, in which data transferred to a wristop computer can be forwarded to a mobile phone, but in that case both the mobile phone and the wristop computer must be specifically designed and programmed for this operation.

Mobile telephone manufacturers are unwilling to tailor separate receivers for their mobile phones, because the numerous wristop computer manufacturers each use different data-transfer protocols.

The invention is intended to eliminate the defects of the prior art disclosed above and for this purpose create an entirely new type of solution.

SUMMARY OF THE INVENTION

The invention is based on an advantageously direct data-transfer connection being formed from the peripheral device of the wristop computer to the mobile phone, through a memory card located in the latter, or alternatively from the wristop computer directly to the memory card of the mobile phone. This connection is preferably digital. According to one preferred embodiment of the invention, the receiver is implemented in the mobile phone in a memory card to be connected to it, so that data transfer can be implemented by procuring a receiver-memory-card for the mobile phone and then installing suitable software in the mobile phone.

More specifically, the memory card according to the invention is characterized in that it includes a receiver, which is able to receive information from at least one measuring device.

The data transfer method according to the invention is, in turn, characterized in that the data is received by the mobile station (1), with the aid of a memory-card receiver (10) located in it.

Considerable advantages are gained with the aid of the invention.

The measurement of heart rate, number of steps, or chain tension can be implemented without an actual wristop computer, or in parallel with it. The transfer of data to the mobile phone permits the measured data to be archived in a desired location, though a telecommunications network. The collection and comparison of data on amateur groups also becomes possible through effective data transmission.

The software of the mobile station can always be easily updated according to the user's requirements and the latest program versions.

The total cost of the equipment to the user is reduced, thus making it less expensive to use peripheral devices in, for example, home nursing. Using the method disclosed, data from a heart-rate transmitter can be forwarded to be available to nursing professionals. In this case, the mobile station can be equipped with suitable software for defining alarm limits and for sending alarms or instructions to the correct destination, for example, back to the wristop computer.

Mobile telephones are equipped with high-quality displays and powerful processors, so that the mobile phone that acts as the basic device will need no other equipment modifications in addition to the memory card, in order to implement the invention.

BRIEF DESCRIPTION OF THE DRAWINGS

In the following, the invention is examined with the aid of examples of applications according to the accompanying drawings.

DETAILED DESCRIPTION OF THE INVENTION

Figure 1:
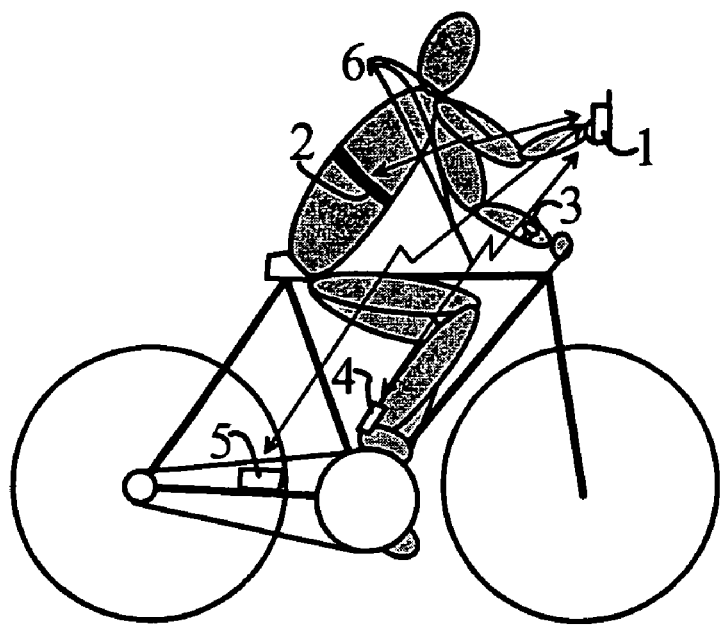
FIG. 1 shows schematically one system configuration according to the invention.

In this application, the following terminology is used:

1 mobile station
2 transmitter belt for heart rate
3 wristop computer
4 pedometer transmitter
5 chain-tension transmitter
6 data-transmission connection between mobile station and peripheral device
10 receiver memory card
11 mobile-station display
12 mobile-station keypad
13 memory-card antenna According to FIG. 1, the user (who is, for example, cycling) can have several wristop-computer peripheral devices, such as a heart-rate transmitter belt 2, a pedometer transmitter 4, or a chain-tension transmitter 5 for forwarding pedalling-power data. Normally, these peripheral devices communicate only with a wristop computer 3, but, according to the invention, they can be arranged to communicate also, or only with a mobile station 1. The mobile station 1 is a normal mobile station, such as a cellular mobile station using any data-transfer protocol whatever. A precondition for the operation according to the invention is that the mobile station 1 has an expansion slot for an external memory card. An example of such a mobile station is the Sony Ericsson P900, in which there is a Memory Stick Duo™ expansion slot. A memory card, which can receive a signal sent by the peripheral devices 2, 4, and 5 and forward it to the data system of the mobile station for further processing or re-transmission, can be placed in such an expansion slot. Expansion slots of this type are typically equipped with power-supply contacts, through which operating power can be supplied to the receiver.

Figure 2:
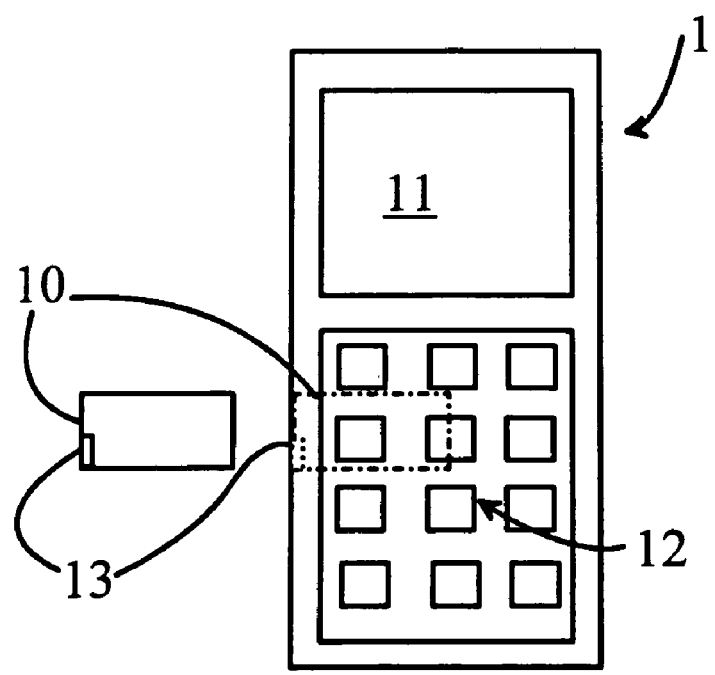
FIG. 2 shows schematically one memory card and mobile station according to the invention.

The actual peripheral devices 2, 4, and 5 need no modification, as long as the receiver of the memory card 10 shown in FIG. 2 is designed and implemented correctly.

In addition to a transmitter, other measuring functionalities, such as the measurement of the ambient pressure and temperature, or a combination of them, can also be located in the memory card 10. Pressure data can be advantageously combined with heart-rate data, making it possible to see the dependence between changes in altitude and heart rate in various exercise situations.

The memory card 10 preferably has an integrated antenna 13, dimensioned externally for the operating frequency being used between the peripheral device and the memory card.

The data-transfer protocol 6 between the peripherals 2, 4, and 5 is typically digital, though analog data transfer is also possible.

Suitable data-transfer protocols are disclosed in, for example, U.S. Pat. No. 5,743,269, Finnish patent 96380, and in the present applicant's confidential Finnish patent applications FI 20031873 and FI 20040930.

According to one preferred embodiment of the invention, the memory card 10 receives the data of the peripherals 2, 4, 5 through a wristop computer 3.

A typical and advantageous feature of the invention is that, when in use, the memory card 10 is mechanically protected inside the mobile phone 1.

The memory card 10 is preferably manufactured with the aid of a special packaging technology. Such technologies include planar circuit techniques, by means of which the circuit totalities are made as thick as the circuit card. In such techniques, the integrated circuits are typically located inside a multi-layered circuit-card structure. The memory cards 10 are preferably inside the telephone and protected by its case, so that typically practically nothing remains outside the device, except perhaps for part of the antenna.

Memory-card technologies that make the invention possible are represented by, for example, the standards SMMC and MMC, which have been developed by SanDisc and Siemens. The storage capacity of an MMC (Multi Media Disc) is about one gigabyte and the corresponding capacity of an SMMC 256 megabytes.

A frequency of 2.4 GHz is typically used in data transfer from a peripheral device. The transmission techniques permit transfer distances of several tens of meters. The peripheral devices and protocols permit two-way telecommunication.

One example of a practical application according to the invention is game applications, in which one parameter in games in the mobile station can be the player's heart rate, which in the manner according to the invention can be transmitted directly from the transmitter belt 2 through the memory card 10 to the mobile station 1, which can always, according to the game application, utilize the heart-rate data to give an extra bonus, or, for example, calculate the heartbeats consecutively and thus influence the game event.

According to the invention, data (for example, heart-rate data) from the peripherals of several users can be collected in the memory-card receiver 10 of a single mobile telephone 1, This procedure will allow, for instance, team coaches to collect data from several team players and guide the team in real time, always according to the loading level of each individual. For example, in mountaineering the most heavily loaded climber (with the highest heart rate) can hand over equipment to others. Similarly, in a cycling team the leader of the team can be changed on the basis of real loading data, with the aid of normal telephones and a memory card 10 according to the invention.

The examples of applications disclosed above do not restrict the scope of protection of our invention, which is described in the following Claims.

The invention claimed is:

1. A memory card for a mobile telephone, comprising:
   a receiver arranged to receive information from a peripheral device of a wristop computer,
   wherein the peripheral device is a measuring device, and
   wherein the receiver is arranged to receive the information from the peripheral device through the wristop computer.

2. A memory card according to claim 1, wherein the receiver is analog.

3. A memory card according to claim 1, wherein the receiver is digital.

4. A memory card according to claim 1, further comprising:
   an antenna for receiving a signal.

5. A memory card according to claim 1, wherein during operation the memory card is protected inside the mobile telephone.

6. A memory card according to claim 1, wherein the memory card is implemented using a multi-layer circuit-board technology, in which integrated circuits are embedded in a circuit-board structure.

7. A memory card according to claim 1, further comprising:
   at least one of: a pressure sensor and a temperature sensor.

8. A data-transfer method, comprising:
   receiving at a mobile station a signal with data for processing from a peripheral device of a wristop computer,
   wherein the data is received by the mobile station with the aid of a memory-card receiver located in the mobile station,
   wherein the peripheral device is a measuring device, and
   wherein the data is received by the mobile station from the peripheral device through the wristop computer.

9. A method according to claim 8,
   wherein the received signal is digital.

10. A method according to claim 8,
    wherein the received signal is analog.

11. A method according to claim 8,
    wherein during operation the memory-card receiver is located inside the mobile telephone.

12. A method according to claim 8, wherein an antenna, which is adapted to the data-transmission frequency being used by the peripheral device, is located in the memory card.

13. A method according to claim 8, wherein the memory-card receiver is implemented using a multi-layer circuit-board technology, in which integrated circuits are embedded inside a circuit-board structure.

14. A method according to claim 8, further comprising:
    receiving signals with data from peripheral devices of multiple users at the mobile station with the aid of the memory-card receiver.

15. A method according to claim 8, further comprising:
    transferring data in both directions between the peripheral device and the memory-card receiver.

16. A method according to claim 8, further comprising:
    using the memory-card receiver to measure at least one of: temperature and pressure.

* * * * *